DATA COMPACTOR
Filed Oct. 24, 1961
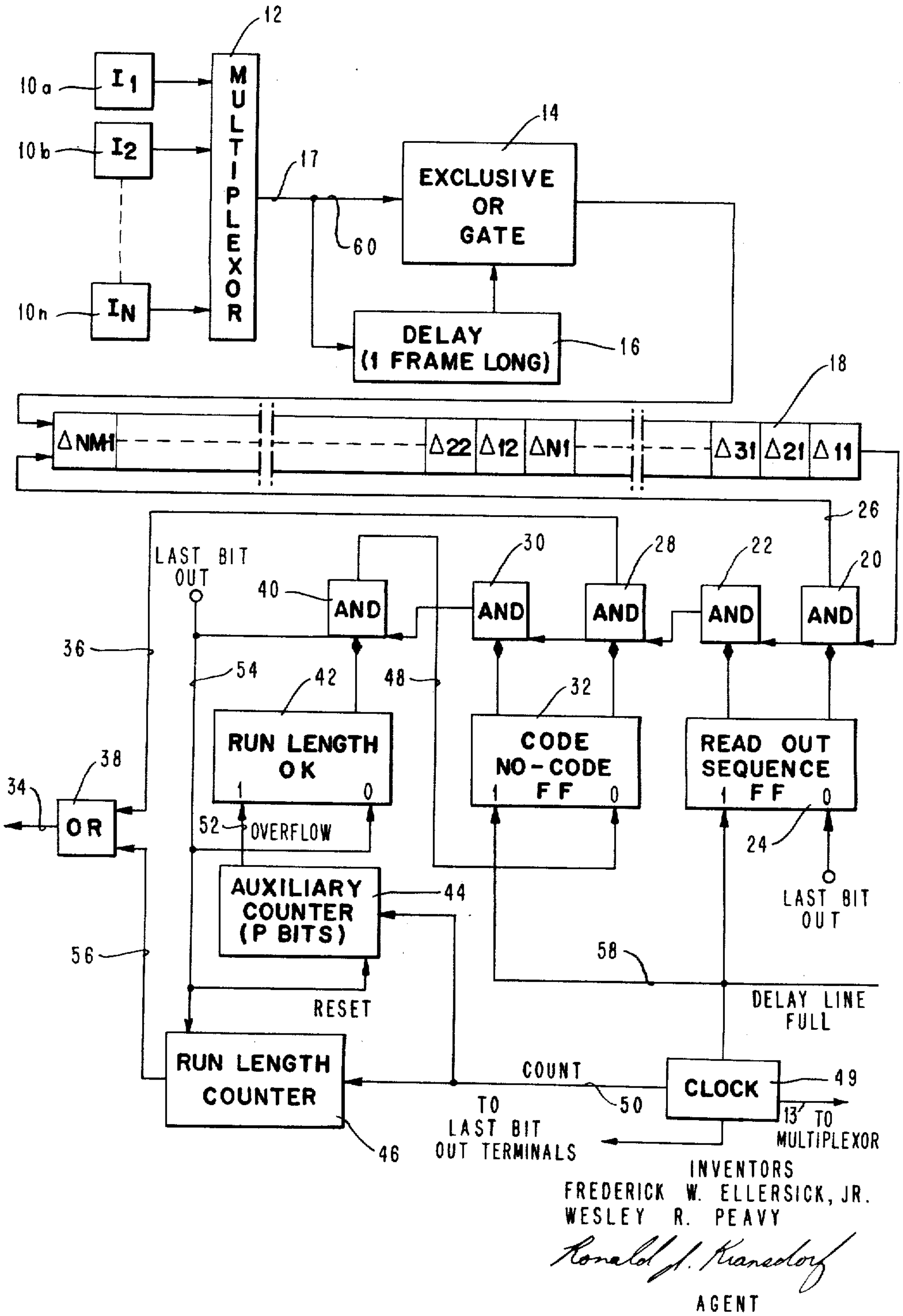
INVENTORS
FREDERICK W. ELLERSICK, JR.
WESLEY R. PEAVY
Ronald J. Kransdorf
AGENT

United States Patent Office 3,185,823

Patented May 25, 1965

3,185,823

DATA COMPACTOR

Frederick W. Ellersick, Jr., Rockville, Md., and Wesley R. Peavy, Washington, D.C., assignors to International Business Machines Corporation, New York, N.Y., a corporation of New York

Filed Oct. 24, 1961, Ser. No. 147,223

4 Claims. (Cl. 235—154)

The invention relates to data compactors and more particularly to a data compactor which is adapted to have its output code varied to achieve optimum compaction.

Successive frames of binary data derived from a plurality of time multiplexed sensors or other input sources generally contain large amounts of unwanted redundancy. When transmitting this data, it has been found that if some or all of these redundancies were eliminated by compacting the data, it would result in a number of advantages. Among these advantages are reductions in transmission time, bandwidth, power and/or error rate, and in storage requirements. If the compaction ratio (C) actually obtained is defined as the ratio of the average number of bits required to represent a message at the compactor input to the average number of bits for a message at the compactor output, then the transmission time (T) required for the same bandwidth can be reduced to $T/C$ or, alternatively, the bandwidth (W) can be reduced to $W/C$. Where weight is a factor, such as in missiles, satellites, and other space vehicles, data compaction, by reducing the power required to transmit the data, permits the use of lighter equipment. Since thermal noise is directly proportional to the bandwidth, the signal power (S) could be reduced to $S/C$ without increasing the signal to noise ($S/No$) ratio.

Another important advantage of data compaction is that it can be used to reduce the bit error rate. It has been shown that the probability of correctly identifying a signal is exponentially proportional to the signal energy. But where time and bandwidth are left the same, the signal energy (S') for the compacted data is equal to CS (where S is the signal energy for the same data in uncompacted form). Therefore, the probability of a correct decision will be exponentially proportional to C. Since the removal of some of the redundancy from the data makes each bit of the remaining data more significant, it may be desirable, for some applications, to use some of the compaction to increase the signal energy and thus to obtain the desired reliability. The remainder of the compaction can be employed to reduce the time, bandwidth, or power required for transmission.

Finally, the compacted data will require a smaller memory to store it until it is needed. For example, in a space vehicle, where memory size and weight are important factors, data compaction would allow the use of a smaller, lighter, memory if the data is to be stored.

One coding scheme for data compaction which yields good results where the input data provides long periods of relatively constant signal, such as the sensors in a space vehicle, is run length coding. With this coding scheme, the data scanned in a given scanning of the sensors is compared in a comparison circuit with the data obtained from the previous scanning of the corresponding sensors and a signal is generated when there is a change. A run length counter counts the number of bits which have been compared between each succeeding pair of such changes, and, when a change occurs, the contents of the counter at the time of the change are presented on the output line of the circuit. With this scheme of coding, it can be mathematically shown that less bits are required to transmit information with a given number of changes where there are a number of long runs and short runs between changes than are required to transmit information containing the same number of changes where there is a moderate number of bits between changes.

It can also be seen that, while run length coding is an effective method of data compaction during periods when the input data is remaining at a relatively constant level, this mode of coding is not very effective, and might even lead to data expansion, where the input data is fluctuating rapidly. During these periods, some other coding mode, such as direct transmission, would yield better results.

The basic object of this invention is, therefore, to provide circuitry for reducing the number of bits required to represent a given sequence of data.

Another object of this invention is to accomplish the above object by providing circuitry adapted to yield long runs and short runs between bit changes as opposed to runs of moderate length.

A further object of this invention is to provide a data compactor that will take advantage of the additional compaction that is available if the bits are considered according to their significance.

Another object of this invention is to provide a data compactor which is capable of switching from one coding mode to another coding mode as the input data sequence varies so as to continue to provide optimum data compaction.

A more specific object of this invention is to provide a run length coded data compactor which is capable of switching to some other mode of coding such as direct transmission when the input data sequence starts fluctuating rapidly.

In accordance with these objects, we exploit the fact that the probability of the most significant bit in the output of a particular input means (for example, a sensor) changing in one frame is substantially lower than the probability of the least significant bit changing when the bits are encoded in standard binary form. The output of the comparison circuit mentioned above (the circuit in which the bits of a given frame are compared with the corresponding bits of the preceding frame and an output generated when a pair of compared bits disagree) is, therefore, fed into a shifting storage means. The bits in this storage means circulate at a bit shifting rate which is equal to an integral multiple of the rate at which the bits of the sensors are entering the comparison circuit. The integer by which the input bit rate is multiplied is equal to the number of sensors being scanned. With this arrangement, when the storage means is full, the most significant bits of all the sensors will be grouped together followed by the next most significant bits from all the sensors and so on. In this way the least significant bits of all the sensors, which are the bits most likely to change, are grouped together at one end of the storage means. When the storage means is full, its contents are serially applied to a gating circuit. A RUN LENGTH counter is stepped in synchronism with the application of bits to the gating circuit. The above circuit is made adaptive by providing a means for indicating when a predetermined number of units of shift time have passed after the occurrence of an output from said storage means. If an output is received from the storage means before an indication is received from the indicating means, the count stored in the RUN LENGTH counter at that time is passed to the circuit output line, and the gating circuit is conditioned to pass all subsequent bits from the storage means directly to the circuit output line. If an indication is received from said indicating means before an output is received from said storage means the RUN LENGTH counter is reset and its contents passed to the circuit output line. This latter process is repeated, the circuit shifting to the direct transmission mode whenever an output from the storage means is applied to the gating circuit before an indication is received from the indicating means. If the circuit does not shift to the direct transmission mode for a frame (the length of time between successive samples of the same sensor), at the end of the frame the RUN LENGTH counter will be reset and its contents passed to the circuit output line.

The foregoing and other objects, features and advantages of the invention will be apparent from the following more particular description of a preferred embodiment of the invention as illustrated in the accompanying drawing.

The figure is a block diagram of a preferred embodiment of the data compactor of this invention.

Referring to the figure, a plurality of sources of binary input data 10*a*–10*n* are sequentially scanned by multiplexor 12. The scan rate of the multiplexor is controlled by synchronizing pulses applied from clock 49 through line 13. The output from the multiplexor 12, which is in the form of a series of binary bits, is simultaneously applied to EXCLUSIVE OR gate 14 and to delay 16. If the input sources 10*a*–10*n* are sources of analog rather than binary data, an analog-to-digital converter may be inserted at the point 17 in the circuit. Delay 16 is one frame long, a frame being defined as the number of bits sensed in one complete scan of the input sources 10*a*–10*n*. The output of the delay line is connected to the other input of EXCLUSIVE OR gate 14. The EXCLUSIVE OR gate is of a type which accepts two binary inputs and generates an output only when its inputs disagree. Therefore, there will be an output from the EXCLUSIVE OR gate only when a bit in a given frame differs from the corresponding bit in the preceding frame.

The difference bits, Δ bits, coming out of EXCLUSIVE OR gate 14 are applied to the input of a delay line 18. The length of this delay line is equal to one less than the total number of bits in a frame, and the bit shifting rate of delay line 18 is equal to N times the bit shifting rate of delay 16 where N is equal to the number of input sources 10*a*–10*n*. Each output from delay line 18 is applied simultaneously to AND gate 20 and 22. Only one of these gates will be conditioned at any given time, the particular gate being conditioned depending upon the state of READ-OUT-SEQUENCE flip-flop 24. A line 26 connects the output of AND gate 20 to the input of delay line 18, providing a feedback path to allow recirculation of information in the delay line. The output from AND gate 22 is applied simultaneously to AND gates 28 and 30. A CODE-NO-CODE flip-flop has its ZERO and ONE D.-C. level outputs connected respectively to the other inputs of AND gates 28 and 30 and thereby conditions one or the other, but not both, of these gates at any given instant. The output of AND gate 28 is connected directly to the circuit output line 34 through line 36 and OR gate 38. The output from AND gate 30 is applied simultaneously to AND gate 40, the ZERO side input of RUN-LENGTH-OK flip-flop 42, the reset inpulse of AUXILIARY counter 44, and the reset-read-out input of RUN-LENGTH counter 46. AND gate 40 is conditioned by the ZERO state output from RUN LENGTH OK flip-flop 42 and the output from AND gate 40 is applied through line 48 to the ZERO side input of CODE-NO-CODE flip-flop 32. Count pulses from clock 49 are applied simultaneously through line 50 to AUXILIARY counter 44 and RUN LENGTH counter 46 in synchronism with the bits coming out of delay line 18 after it is full. The AUXILIARY counter can count up to P bits, P being the minimum number of bits between changes which is acceptable, and, when more than P bits are applied to this counter, an overflow signal appears on an overflow line 52 which signal is applied to the ONE state input of RUN LENGTH OK flip-flop 42. The RUN LENGTH counter has a capacity equal to the total number of bits in a single frame and, when this counter is reset by a signal on line 54, its contents are applied through line 56 and OR gate 38 to circuit output line 34.

When delay line 18 is full, a timing pulse from clock 49 is applied to DELAY-LINE-FULL line 58 to switch READ OUT SEQUENCE flip-flop 24 and CODE-NO-CODE flip-flop 32 to their ONE state. When the last bit of a given frame has passed out of delay line 18, a timing pulse from clock 49 is applied to the LAST-BIT-OUT lines to reset READ OUT SEQUENCE flip-flop 24 and RUN LENGTH OK flip-flop 42 to their ZERO states and to reset counters 44 and 46.

In describing the operation of this circuit, it will be assumed that the input sources 10*a*–10*n* are various sensors in a space vehicle and that the information coming out on output line 34 is being fed to a transmitter to be transmitted to earth. It will also be assumed that means are provided to transmit the output from the multiplexor resulting from the first scan of the sensors 10*a*–10*n* directly to earth to provide a frame of reference for subsequently-transmitted coded data and that this means may be periodically energized to transmit selected frames of complete uncoded data to update the storage equipment on the ground and limit the propagation of errors. Finally, it will be assumed that a ONE bit is represented by the presence of a signal and a ZERO bit by the absence of a signal and that, at the beginning of each frame, flip-flops 24 and 42 are in their ZERO states and flip-flop 32 is in its ONE state.

For the second and all subsequent frames (with the exception of the updating frames mentioned above) the series of binary bits out of multiplexor 12 will be applied simultaneously to EXCLUSIVE OR gate 14 and delay 16. If the tap off for direct transmission is taken at a point such as point 60, the delay 16 will be full at the beginning of the second frame and each bit of frame 2 coming from the multiplexor will be compared in EXCLUSIVE OR gate 14 with the corresponding bit of frame 1 coming from delay 16 and an input will be applied to delay line 18 only where these bits differ. The result of the comparison for the most significant bit of the first sensor will be placed in delay line 18 at a position designated $\Delta_{11}$. (Note: the Δ positions in the delay line are the positions at which various bits of data are stored and these positions will shift with the data as it moves through the delay line. The positions will be arranged as shown in the figure only when the delay line is full.) Since information moves through N positions of delay line 18N for each position of delay 16, the result of the comparison for the second most significant bit of the first sensor will be placed in a position designated $\Delta_{12}$, which position is N positions further down the delay line from position $\Delta_{11}$. This process is repeated until the results of the comparison for all the bits of the first sensor have been stored in delay line 18. When information stored in the $\Delta_{11}$ position reaches the end of delay line 18 it will find AND gate 20 conditioned (the READ-OUT SEQUENCE flip-flop 24 being in its ZERO state), and the contents of this position will, therefore, be returned through line 26 to the input of delay line 18. Since delay line 18 is one bit shorter than delay 16, the information stored in position $\Delta_{11}$ will have advanced one position from the input terminal before the result of the comparison of the most significant bit of the second sensor is applied to the delay line. This information will, therefore, be placed in the position designated $\Delta_{21}$ which position is directly adjacent to position $\Delta_{11}$. This reading-in and recirculating process will be continued, the result of the comparison for the most significant bit of the last sensor being stored in a position $\Delta_{N1}$ which is between the position occupied by the result of the comparison for the most significant bit of the next to the last sensor and the position for the result of the comparison of the second most significant bit of the first sensor, until delay line 18 is full. When delay line 18 is full, the positions will be arranged as shown in the figure with all the bits of a single frame, except the least significant bit for the last sensor, in the delay line. (Note: there are M bits per sensor, therefore, there are NM–1 bits in delay line 18 when it is full.) At this time a pulse from clock 49 is applied to delay-line-full line 58 to switch the READ-OUT SEQUENCE flip-flop 24 to its ONE state and to switch the CODE-NO-CODE flip-flop 32 to its ONE state. Instead of being fed back through line 26, the signals coming out of delay line 18 are now passed through conditioned AND gates 22 and 30 to AND gate 40 and line 54. At the same time that the DELAY-LINE-FULL pulse is applied to line 58, the first of a train of periodic timing pulses from clock 49 is applied to line 50 to step counters 44 and 46 in synchronism with the passage of bits from delay line 18 into the gating circuit. As the first bit passes from delay line 18 into the gating circuit, the result of the second frame comparison for the least significant bit of the last sensor is fed into the delay line. As the remainder of the Δ bits of the second frame are passing into the gating circuit, the results of the third frame comparisons for the first sensor are being stored in delay line 18.

For the purpose of considering the action of the gating circuit, the Δ bits stored in delay line 18 at the end of a frame can be considered as falling into three possible categories. The first category would be where all the Δ bits are ZERO. Here, there would be no bits passing through AND gates 22 and 30, and AUXILIARY counter 44 would exceed its capacity causing an overflow signal to appear on line 52 to switch RUN LENGTH OK flip-flop 42 to its ONE state and, at the end of the frame, RUN LENGTH counter 46 would be full. At the end of the frame, as the last Δ bit frame 2 passes out of delay line 18, a LAST-BIT-OUT pulse would be applied to reset the READ OUT SEQUENCE flip-flop to its ZERO state causing the third frame Δ bits for the first sensor to be recirculated through line 26 in the same manner as described above for frame 2; and resetting the RUN LENGTH OK flip-flop to its ZERO state to recondition gate 40 and reset AUXILIARY counter 44 in preparation for frame 3. This pulse would also reset RUN-LENGTH counter 46 in preparation for the next frame causing this counter's contents to pass through line 56 and OR gate 38 to the circuit output line 34 to be transmitted to earth. In this embodiment of the invention, a fixed number of bits is always used to transmit the contents of the RUN-LENGTH counter (this number of bits being equal to the number required to represent all the bits in one frame) so that no flag signal is needed to indicate the beginning and end of a count. If variable word lengths were used to transmit the count of the RUN-LENGTH counter, the number of bits used being equal to the number of bits required to transmit the particular number which is in the counter at the given instant, then some sort of flag signal would be required either at the beginning or the end of each count to indicate where one count began and the other ended. In the circuit, as shown, the receiver on earth interprets a full-frame count from the transmitter as meaning that there was no change in any of the sensors in the present frame over the preceding one.

The second category is where one or more of the bits are ONES, but the spacing between these ONES is greater than P bits. Here, as before, when the delay line is full, a signal is applied to line 58 to switch the READ-OUT SEQUENCE flip-flop and the CODE-NO-CODE flip-flop to their ONE state causing the output from delay line 18 to be diverted from feedback line 26 to the gating circuit. Since the spacing between ONE bits is greater than P, an overflow would have appeared on line 52 from AUXILIARY counter 44 to switch RUN LENGTH OK flip-flop 42 to its ONE state and decondition AND gate 40 before the first ONE bit passed from the delay line 18 to the gating circuit. This first ONE bit would pass through gates 22 and 30 and would be applied to line 54 to reset the RUN LENGTH OK flip-flop to its ZERO condition (reconditioning gate 40), to reset AUXILIARY counter 44, and to reset RUN LENGTH counter 46 causing the contents of this counter to pass through line 56 and OR gate 38 to the circuit output line 34 and on to the transmitter. Since the same bit of the same sensor **10*a*–10*n*** will always appear in the same position of the frame, the receiver on the ground, by knowing the position in the frame at which the change occurred can determine which sensor has changed and by how much.

The above process would be repeated for each ONE bit coming out of the delay line. Since there will always be at least P bits between each of these ONES, the gate 40 will always be deconditioned. When the last bit of frame 2 has passed from delay line 18 into the gating circuit, a LAST-BIT-OUT pulse from clock 49 will be applied to reset flip-flops and counters and cause the output of the RUN LENGTH counter to be transmitted in the manner already described for category 1 above.

The third category would be where one or more of the frame 2 Δ bits are ONES and the spacing either between the beginning of the delay line and the first ONE bit or between any successive pair of the ONE bits is less than P. For this situation, the operation of the circuit would be the same as that described above for category 2 until the first ONE bit came through the gating circuit spaced less than P bits from the preceding ONE bit. Assume, for the sake of illustration that the distance between the first and the second ONE bits coming out of delay line 18 for frame 2 was less than P. Then the first ONE bit would pass through the gating circuit and would cause a resetting of the RUN LENGTH OK flip-flop and the counters causing an output from the RUN LENGTH counter as described for category 2 above. However, when the second ONE bit arrives at the gating circuit, the auxiliary counter 44 has not yet exceeded its capacity and the RUN LENGTH OK flip-flop is still in its ZERO condition conditioning gate 40. This second ONE bit would, therefore, pass through gates 22 and 30 and would pass through gate 40 and line 48 to switch the CODE-NO-CODE flip-flop 32 to its ZERO state. This pulse would also pass through line 54 to reset the RUN LENGTH OK flip-flop 32, the AUXILIARY counter 44, and the RUN LENGTH counter 46, and would cause the usual output of the count of the RUN LENGTH counter on output line 34. By switching the state of the CODE-NO-CODE flip-flop, the circuit has switched from its run-length coding mode of transmission to the direct mode of transmission. The receiver on the ground will be made aware of this transition by the count of less than P received from the RUN LENGTH counter 46. Any subsequent ONE bit coming into the gating circuit from delay 18 will pass through directly to circuit output line 34 via AND gates 22 and 28, line 36, and OR gate 38. Means will be provided for synchronizing the transmitted data (as for example by transmitting it on a real-time basis) with synchronizing equipment on the ground energized by the information as to the change in mode, to properly place the transmitted bits into the information sequence. The count signals coming in on line 50 will also be suppressed when the circuit is operating in the direct transmission mode. When the last bit of frame 2 has passed from delay line 18 into the gating circuit, a LAST-BIT-OUT pulse will be applied to reset flip-flops 24 and 42 and counters 44 and 46. The count pulses on line 50 being suppressed, there will be no output from RUN LENGTH counter 46 at this time.

Since most of the changes will be occurring in the less significant bits, the use of direct transmission for these bits of the frame is particularly advantageous.

In the circuit described so far, a delay line 18 has been used to store and rearrange the bits. While a delay line is particularly suitable for this purpose, any shifting or shiftable storage means, for example, a shift register, may be used for this purpose. This is also true for the delay 16. Also, instead of making the delay line 18 one bit shorter than the delay 16, a separate tap-off one position to the left of the right end of the delay line could be taken to gate 20, or, if a suitable delay line could be found, the feedback line 26 could be applied to a tap one position to the right of the left end of the delay line. The particular circuits used in the blocks shown in the figure, are not considered part of this invention and any suitable circuit may be used.

While the invention has been particularly shown and described with reference to a preferred embodiment thereof, it will be understood by those skilled in the art that the foregoing and other changes in form and details may be made therein without departing from the spirit and scope of the invention.

We claim:

1. An adaptive circuit for reducing the number of binary bits required at the circuit output line to represent a frame of binary data from a plurality of input sources comprising in combination:

means for successively sampling the bits of said input sources, to thereby generate a series of frames of binary data, each frame comprised of a bit sample from each of said input sources;

delay means for delaying successive frames;

circuit means for comparing data bits in a given frame with the corresponding data bits in the preceding frame on a bit by bit basis and for generating an output when the bits compared disagree;

a shifting storage means the shift rate of which is equal to the number of input means times the rate at which bits are applied to said circuit means, means for applying the output from said circuit means to said storage means;

feedback means for normally causing the output from said storage means to be recirculated, the recirculation time for a given bit being one shift time less than the time required to compare the bits from a single input source in said circuit means;

a gating circuit, pulse means operating synchronously with said sampling means for issuing a pulse coincidently with the filling of said storage means, said feedback means being responsive to said pulse for switching the storage means output to said gating circuit;

and a run length counter, said pulse means being operative, when said storage means is full, to apply count pulses to said run length counter, the rate at which said count pulses are applied to said counter being equal to the shift rate of said storage means;

said gating circuit including means responsive to an output from said storage means for causing the contents of said run length counter to be presented to the circuit output line.

2. An adaptive circuit for reducing the number of binary bits required at the circuit output line to represent a frame of binary data from a plurality of input sources comprising in combination:

means for successively sampling the bits of said input sources, to thereby generate a series of frames of binary data, each frame comprised of a bit sample from each of said input sources;

delay means for delaying successive frames;

circuit means for comparing data bits in a given frame with the corresponding data bits in the preceding frame on a bit by bit basis and for generating an output when the bits compared disagree;

a shifting storage means the shift rate of which is equal to the number of input means times the rate at which bits are applied to said circuit means, means for applying the output from said circuit means to said storage means;

feedback means for normally causing the output from said storage means to be recirculated, the recirculation time for a given bit being one shift time less than the time required to compare the bits from a single input source in said circuit means;

a gating circuit, pulse means operating synchronously with said sampling means for issuing a pulse coincidently with the filling of said storage means, said feedback means being responsive to said pulse for switching the storage means output to said gating circuit;

a run length counter, said pulse means being operative, when said storage means is full, to apply count pulses to said run length counter, the rate at which said count pulses are applied to said counter being equal to the shift rate of said storage means;

said gating circuit including means normally responsive to an output from said storage means for causing the contents of said run length counter to be presented to the circuit output line;

means for indicating when a predetermined number of units of shift time have passed after the occurrence of an output from said storage means, and means responsive to the occurrence of an output from said storage means prior to the occurrence of an indication from said indicating means for causing subsequently occurring outputs from said storage means to pass directly to said circuit output line.

3. An adaptive circuit for reducing the number of binary bits required at the circuit output line to represent a frame of binary data from a plurality of input sources comprising in combination:

means for successively sampling the bits of said input sources, to thereby generate a series of frames of binary data, each frame comprised of a bit sample from each of said input sources;

delay means for delaying successive frames;

circuit means for comparing data bits in a given frame with the corresponding data bits in the preceding frame on a bit by bit basis and for generating an output when the bits compared disagree;

a shifting storage means the shift rate of which is equal to the number of input means times the rate at which bits are applied to said circuit means, means for applying the output from said circuit means to said storage means;

feedback means for normally causing the output from said storage means to be recirculated, the recirculation time for a given bit being one shift time less than the time required to compare the bits from a single input source in said circuit means;

a gating circuit, pulse means operating synchronously with said sampling means for issuing a pulse coincidently with the filling of said storage means, said feedback means being responsive to said pulse for switching the storage means output to said gating circuit;

a run length counter, said pulse means being operative, when said storage means is full, to apply count pulses to said run length counter, the rate at which said count pulses are applied to said counter being equal to the shift rate of said storage means;

said gating circuit including means normally responsive to an output from said storage means for causing the contents of said run length counter to be presented to the circuit output line;

counter means for counting the number of units of shift time between outputs from said storage means, the capacity of said counter means being less than the number of bits in one frame, said counter means including means for generating a control signal when the capacity of the counter means is exceeded, and means responsive to the occurrence of an output from said storage means prior to the occurrence of said control signal for causing subsequently occurring outputs from said storage means to pass directly to said circuit output line.

4. An adaptive circuit for reducing the number of binary bits required at the circuit output line to represent a frame of binary data from a plurality of input sources comprising in combination:

means for successively sampling the bits of said input sources, to thereby generate a series of frames of binary data, each frame comprised of a bit sample from each of said input sources;

delay means for delaying successive frames;

circuit means for comparing data bits in a given frame with the corresponding data bits in the preceding frame on a bit by bit basis and for generating an output when the bits compared disagree;

a delay line, means for applying the output from said circuit means to said delay line, the shift rate of said delay line being equal to the number of input means times the rate at which bits are applied to said circuit means;

feedback means for normally causing the output from said delay to be recirculated, the recirculation time for a given bit being one shift time less than the time required to compare the bits from a single input source in said circuit means;

a gating circuit, pulse means operating synchronously with said sampling means for issuing a pulse coincidently with the filling of said delay line, said feedback means being responsive to said pulse for switching the delay line output to said gating circuit;

a run length counter, said pulse means being operative, when said delay line is full, to apply count pulses to said run length counter, the rate at which said count pulses are applied to said counter being equal to the shift rate of said delay line;

said gating circuit including means normally responsive to an output from said delay line for causing the contents of said run length counter to be presented to the circuit output line;

counter means for counting the number of units of shift time between outputs from said delay line, the capacity of said counter means being less than the number of bits in one frame, said counter means including means for generating a control signal when the capacity of the counter means is exceeded, and means responsive to the occurrence of an output from said delay line prior to the occurrence of said control signal for causing subsequently occurring outputs from said delay line to pass directly to said circuit output line.

No references cited.

MALCOLM A. MORRISON, *Primary Examiner.*